United States Patent
Suggs

(10) Patent No.: US 6,880,941 B2
(45) Date of Patent: Apr. 19, 2005

(54) VEHICLE BLIND SPOT MONITORING SYSTEM

(76) Inventor: Tony R. Suggs, 1950 N. Point Blvd., Tallahassee, FL (US) 32308

( * ) Notice: Subject to any disclaimer, the term of this patent is extended or adjusted under 35 U.S.C. 154(b) by 14 days.

(21) Appl. No.: 10/458,780

(22) Filed: Jun. 11, 2003

(65) Prior Publication Data

US 2004/0252389 A1 Dec. 16, 2004

(51) Int. Cl.⁷ .............................. B60R 1/08; G02B 7/182
(52) U.S. Cl. ....................... 359/843; 359/872; 359/877; 701/49
(58) Field of Search ............................... 359/843, 877, 359/838, 872, 873, 874, 876; 701/49

(56) References Cited

U.S. PATENT DOCUMENTS

| | | | |
|---|---|---|---|
| 3,825,324 A | | 7/1974 | Brewington |
| 4,727,302 A | * | 2/1988 | Mizuta et al. ............... 318/567 |
| 4,786,156 A | | 11/1988 | Kotani et al. |
| 4,834,522 A | | 5/1989 | Janowicz |
| 4,907,870 A | | 3/1990 | Brucker |
| 4,971,430 A | | 11/1990 | Lynas |
| 5,033,835 A | * | 7/1991 | Platzer, Jr. ................... 359/877 |
| 5,566,028 A | | 10/1996 | Wodeslavsky ............... 359/871 |
| 5,668,675 A | | 9/1997 | Fredricks ..................... 359/843 |
| 5,745,310 A | | 4/1998 | Mathieu ...................... 359/843 |
| 5,886,838 A | * | 3/1999 | Kuramoto .................... 359/841 |
| 6,193,380 B1 | | 2/2001 | Jacobs ......................... 359/843 |
| 6,350,037 B1 | | 2/2002 | Adams ........................ 359/843 |
| 2002/0154007 A1 | | 10/2002 | Yang .......................... 340/456 |
| 2002/0159171 A1 | | 10/2002 | Schnell et al. .............. 359/877 |

FOREIGN PATENT DOCUMENTS

| | | |
|---|---|---|
| DE | 3705991 A1 | 9/1988 |
| DE | 4115474 A1 | 11/1992 |
| DE | 4334800 A1 | 5/1994 |
| WO | WO 91/19626 A1 * | 12/1991 |

* cited by examiner

Primary Examiner—John Juba, Jr.

(57) ABSTRACT

A vehicle blind spot monitoring system includes an adjustable side view mirror(s), a mirror controller configured to control an angular orientation of the adjustable side view mirror(s), side view mirror adjustment actuator(s) configured to enable a vehicle occupant to remotely adjust, in a normal operating condition, angular orientations of the adjustable side view mirror(s) in a normal orientation range, and side view blind spot adjustment actuator(s) configured to enable a vehicle occupant to remotely adjust, in a blind spot operating condition, angular orientations of the adjustable side view mirror(s) in blind spot orientation ranges. The adjustable side view mirror(s), the side view mirror adjustment actuator(s), and the side view blind spot adjustment actuator(s) are each communicatively interconnected with the mirror controller.

20 Claims, 4 Drawing Sheets

VEHICLE BLIND SPOT MONITORING SYSTEM

BACKGROUND OF THE INVENTION

1. Field of the Invention

The present invention relates generally to vehicle side view mirrors and, more particularly, to a vehicle blind spot monitoring system.

2. Description of the Related Art

Blind spots are well known to drivers of vehicles as rear view areas that vehicle drivers are unable to view using their side and/or rear view mirrors. Side view mirrors enhance the safety of vehicles because they assist vehicle drivers in determining whether an adjacent lane is clear to the side and rear of the vehicle before making a lane change. However, despite numerous attempts at inhibiting the effects blind spots have on vehicle drivers, there remains a need to provide vehicle side view mirrors that assist in minimizing the detrimental effects of blind spots.

The related art is represented by the following references of interest.

U.S. patent application Publication No. 2002/0154007 A1, published on Oct. 24, 2002 for Tsun-Lung Yang, describes a car reverse alerting and multi-functional display, wherein a driver can reverse a car safely from image and speech alerts. The Yang application does not suggest a vehicle blind spot monitoring system according to the claimed invention.

U.S. patent application Publication No. 2002/0159171 A1, published on Oct. 31, 2002 for Robert E. Schnell et al., describes a vehicular rearview mirror blind spot viewing system which enables moving the reflective mirror element to an alternate position for viewing of areas adjacent the vehicle which otherwise would be hidden in the driver's blind spot. The Schnell et al. patent does not suggest a vehicle blind spot monitoring system according to the claimed invention.

U.S. Pat. No. 3,825,324, issued on Jul. 23, 1974 to Harold G. Brewington, describes an apparatus for remotely controlling, from the inside of a vehicle, the position of a side-view mirror mounted on the outside of the vehicle. The Brewington patent does not suggest a vehicle blind spot monitoring system according to the claimed invention.

U.S. Pat. No. 4,786,156, issued on Nov. 22, 1988 to Kunio Kotani et al., describes a remote control side mirror device for a vehicle capable of rotating a mirror housing with respect to a mirror base fixed to an automotive body by a motor driven remote control. The Kotani et al. patent does not suggest a vehicle blind spot monitoring system according to the claimed invention.

U.S. Pat. No. 4,834,522, issued on May 30, 1989 to Miroslaw Janowicz, describes an outside rear view mirror for vehicles. The Janowicz patent does not suggest a vehicle blind spot monitoring system according to the claimed invention.

U.S. Pat. No. 4,907,870, issued on Mar. 13, 1990 to Milton Brucker, describes a motor vehicle side view mirror assembly. The Brucker patent does not suggest a vehicle blind spot monitoring system according to the claimed invention.

U.S. Pat. No. 4,971,430, issued on Nov. 20, 1990 to Robert M. Lynas, describes a rearview mirror system for a vehicle. The Lynas patent does not suggest a vehicle blind spot monitoring system according to the claimed invention.

U.S. Pat. No. 5,566,028, issued on Oct. 15, 1996 to Josef Wodeslavsky, describes a vacuum controlled side-rear view mirror for exposing vehicle blind spots. The Wodeslavsky patent does not suggest a vehicle blind spot monitoring system according to the claimed invention.

U.S. Pat. No. 5,668,675, issued on Sep. 16, 1997 to Ronald J. Fredricks, describes an opto-electronic alignment method and apparatus capable of being incorporated into left and right side vehicle exterior sideview mirrors to assist the driver in adjusting the mirror to minimize the presence of any traffic blind spots on a side of the vehicle. The Fredricks patent and application does not suggest a vehicle blind spot monitoring system according to the claimed invention.

U.S. Pat. No. 5,745,310, issued on Apr. 28, 1998 to Raymond J. Mathieu, describes a method and apparatus enabling an operator of a vehicle wishing to change traffic lanes to temporarily scan an angle of an area outside the normal angle of viewing of a conventional flat side rear view mirror. The Mathieu patent does not suggest a vehicle blind spot monitoring system according to the claimed invention.

U.S. Pat. No. 6,193,380 B1, issued on Feb. 27, 2001 to Raymond A. Jacobs, describes an angularly adjustable side view mirror mounted on a vehicle. The Jacobs patent does not suggest a vehicle blind spot monitoring system according to the claimed invention.

U.S. Pat. No. 6,350,037 B1, issued on Feb. 26, 2002 to Thomas D. Adams, describes automobile safety mirrors that eliminate blind spots. The Adams patent does not suggest a vehicle blind spot monitoring system according to the claimed invention.

Germany Patent Application Publication No. 3,705,991 A1, published on Sep. 1, 1988, describes a device for a for a motor vehicle side view mirror. The Germany '991 application does not suggest a vehicle blind spot monitoring system according to the claimed invention.

Germany Patent Application Publication No. 4,115,474 A1, published on Nov. 12, 1992, describes an adjustable side view mirror fo a vehicle. The Germany '474 application does not suggest a vehicle blind spot monitoring system according to the claimed invention.

Germany Patent Application Publication No. 4,334,800 A1, published on May 19, 1994, describes a steering wheel for a car that has fingertip switches incorporated into the inner surface of the rim. The Germany '800 application does not suggest a vehicle blind spot monitoring system according to the claimed invention.

None of the above inventions and patents, taken either singularly or in combination, is seen to describe the instant invention as claimed. Thus a vehicle blind spot monitoring system solving the aforementioned problems is desired.

SUMMARY OF THE INVENTION

The present invention is a vehicle blind spot monitoring system. The vehicle blind spot monitoring system includes adjustable side view mirror(s), a mirror controller configured to control an angular orientation of the adjustable side view mirror(s), side view mirror adjustment actuator(s) configured to enable a vehicle occupant to remotely adjust, in a normal operating condition, angular orientations of the adjustable side view mirror(s) in a normal orientation range, and side view blind spot adjustment actuator(s) configured to enable a vehicle occupant to remotely adjust, in a blind spot operating condition, angular orientations of the adjustable side view mirror(s) in blind spot orientation ranges. The adjustable side view mirror(s), the side view mirror adjustment actuator(s), and the side view blind spot adjustment actuator(s) are each communicatively interconnected with the mirror controller.

Accordingly, it is a principal aspect of the invention to provide a vehicle blind spot monitoring system including at least one adjustable side view mirror; a mirror controller configured to control an angular orientation of the at least one adjustable side view mirror; at least one mirror adjustment actuator configured to enable a vehicle occupant to remotely adjust, in a normal operating condition, an angular orientation of the at least one adjustable side view mirror in a normal orientation range; and at least one blind spot adjustment actuator configured to enable a vehicle occupant to remotely adjust, in a blind spot operating condition, an angular orientation of the at least one adjustable side view mirror in a blind spot orientation range; wherein the at least one adjustable side view mirror, the at least one mirror adjustment actuator, and the at least one blind spot adjustment actuator are each communicatively interconnected with the mirror controller.

It is another aspect of the present invention to provide a vehicle blind spot monitoring system including an adjustable left view mirror; a mirror controller configured to control an angular orientation of the adjustable left view mirror, the mirror controller having a processor and a memory; a left view mirror adjustment actuator configured to enable a vehicle occupant to remotely adjust, in a normal operating condition, an angular orientation of the adjustable left view mirror in a normal orientation range; and a left view blind spot adjustment actuator configured to enable a vehicle occupant to remotely adjust, in a blind spot operating condition, an angular orientation of the adjustable left view mirror in a blind spot orientation range; wherein the adjustable left view mirror, the left view mirror adjustment actuator, and the left view blind spot adjustment actuator are each communicatively interconnected with the mirror controller; and wherein the mirror memory carries thereon blindview software which, when executed by the processor of the vehicle blind spot monitoring system, causes the processor to adjust the left view mirror to a normal orientation position within a normal orientation range when the left view mirror adjustment actuator is engaged for a period of time; save data regarding the normal orientation position of the left view mirror when the left view mirror is adjusted and the left view mirror adjustment actuator is disengaged by the user; override movement activity of the left view mirror associated with the engaged left view mirror adjustment actuator when the left view blind spot adjustment actuator is engaged by a user for a period of time; adjust the left view mirror to a blind spot orientation position when the left view blind spot adjustment actuator is engaged by the user for a period of time; activate an audible indicator to emit a blind spot engagement audible sound when the left view mirror is adjusted and initially reaches the blind spot orientation position; activate all left turn visual indicators when the left view mirror is adjusted and initially reaches the blind spot orientation position; activate the audible indicator when the left view blind spot adjustment actuator to emit a blind spot disengagement audible sound when the left view blind spot adjustment actuator is disengaged and subsequently engaged by a user for a period of time, and the left view mirror is adjusted and returns to the normal orientation position; deactivate all left turn visual indicators when the left view blind spot adjustment actuator is disengaged and is subsequently engaged by a user for a period of time; and save data regarding the blind spot orientation position of the left side mirror when the left view mirror is adjusted and initially reaches the blind spot orientation position.

Still another aspect of, the present invention to provide a vehicle blind spot monitoring system including an adjustable right view mirror; a mirror controller configured to control an angular orientation of the adjustable right view mirror, the mirror controller having a processor and a memory; a right view mirror adjustment actuator configured to enable a vehicle occupant to remotely adjust, in a normal operating condition, an angular orientation of the adjustable right view mirror in a normal orientation range; and a right view blind spot adjustment actuator configured to enable a vehicle occupant to remotely adjust, in a blind spot operating condition, an angular orientation of the adjustable right view mirror in a blind spot orientation range; wherein the adjustable right view mirror, the right view mirror adjustment actuator, and the right view blind spot adjustment actuator are each communicatively interconnected with the mirror controller; and wherein the mirror memory carries thereon blindview software which, when executed by the processor of the vehicle blind spot monitoring system, causes the processor to adjusts the right view mirror to a normal orientation position within a normal orientation range when the right view mirror adjustment actuator is engaged for a period of time; save data regarding the normal orientation position of the right view mirror when the right view mirror is adjusted and the right view mirror adjustment actuator is disengaged by the user; override movement activity of the right view mirror associated with the engaged right view mirror adjustment actuator when the right view blind spot adjustment actuator is engaged by a user for a period of time; adjust the right view mirror to a blind spot orientation position when the right view blind spot adjustment actuator is engaged by the user for a period of time; activate an audible indicator to emit a blind spot engagement audible sound when the right view mirror is adjusted and initially reaches the blind spot orientation position; activate all right turn visual indicators when the right view mirror is adjusted and initially reaches the blind spot orientation position; activate the audible indicator when the right view blind spot adjustment actuator to emit a blind spot disengagement audible sound when the right view blind spot adjustment actuator is disengaged and subsequently engaged by a user for a period of time, and the right view mirror is adjusted and returns to the normal orientation position; deactivate all right turn visual indicators when the right view blind spot adjustment actuator is disengaged and is subsequently engaged by a user for a period of time; and save data regarding the blind spot orientation position of the right view mirror when the right view mirror is adjusted and initially reaches the blind spot orientation position.

It is an aspect of the invention to provide improved elements and arrangements thereof in a vehicle blind spot monitoring system for the purposes described which is inexpensive, dependable and fully effective in accomplishing its intended purposes.

These and other aspects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
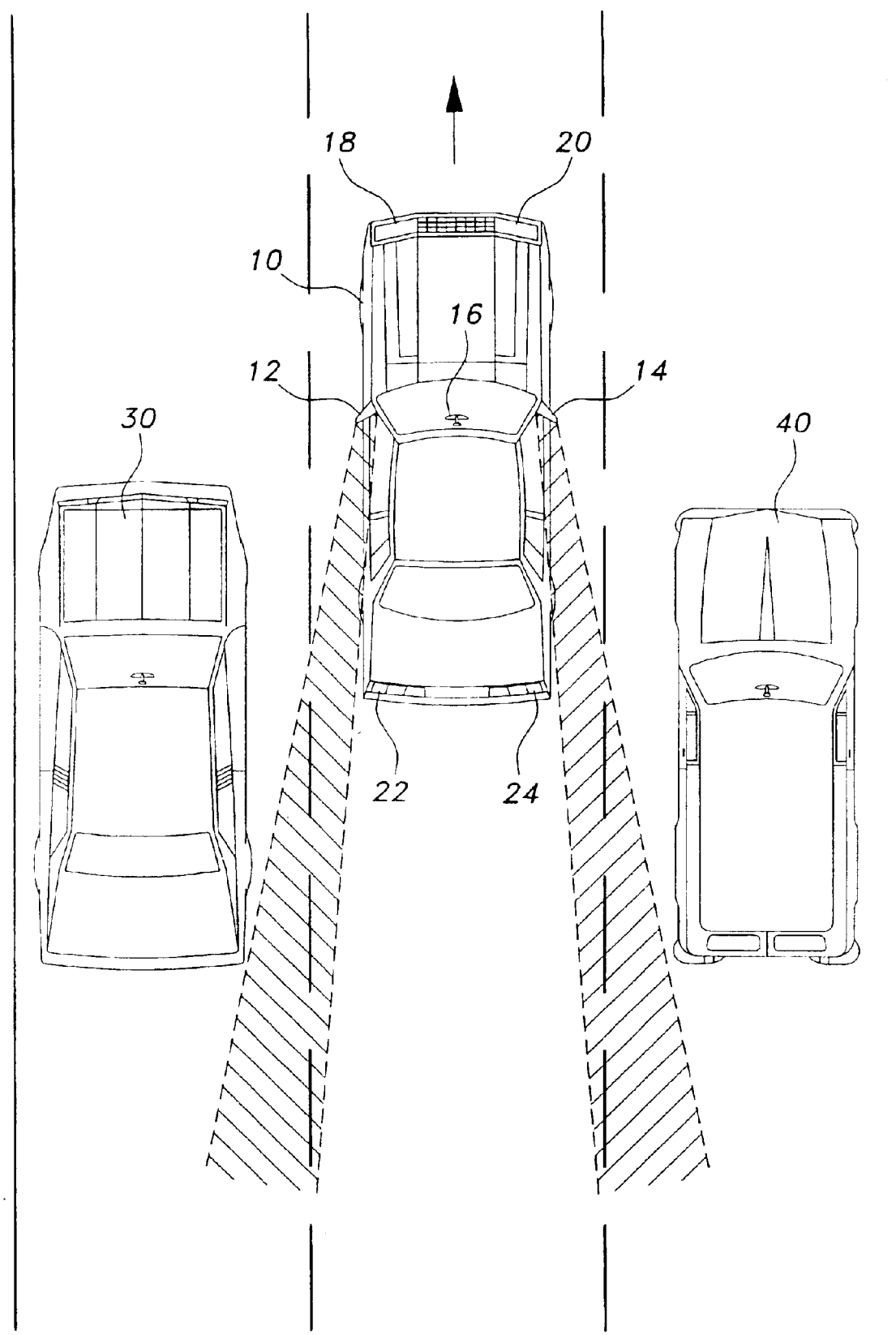
FIG. 1 is a top view of three vehicles driving along three driving lanes, where the middle vehicle is equipped with a vehicle blind spot monitoring system according to the present invention and the view mirrors are adjusted within a normal orientation range.

The present invention is a vehicle blind spot monitoring system. The invention disclosed herein is, of course, susceptible of embodiment in many different forms. Shown in the drawings and described herein below in detail are preferred embodiments of the invention. It is to be understood, however, that the present disclosure is an exemplification of the principles of the invention and does not limit the invention to the illustrated embodiments.

Figure 2:
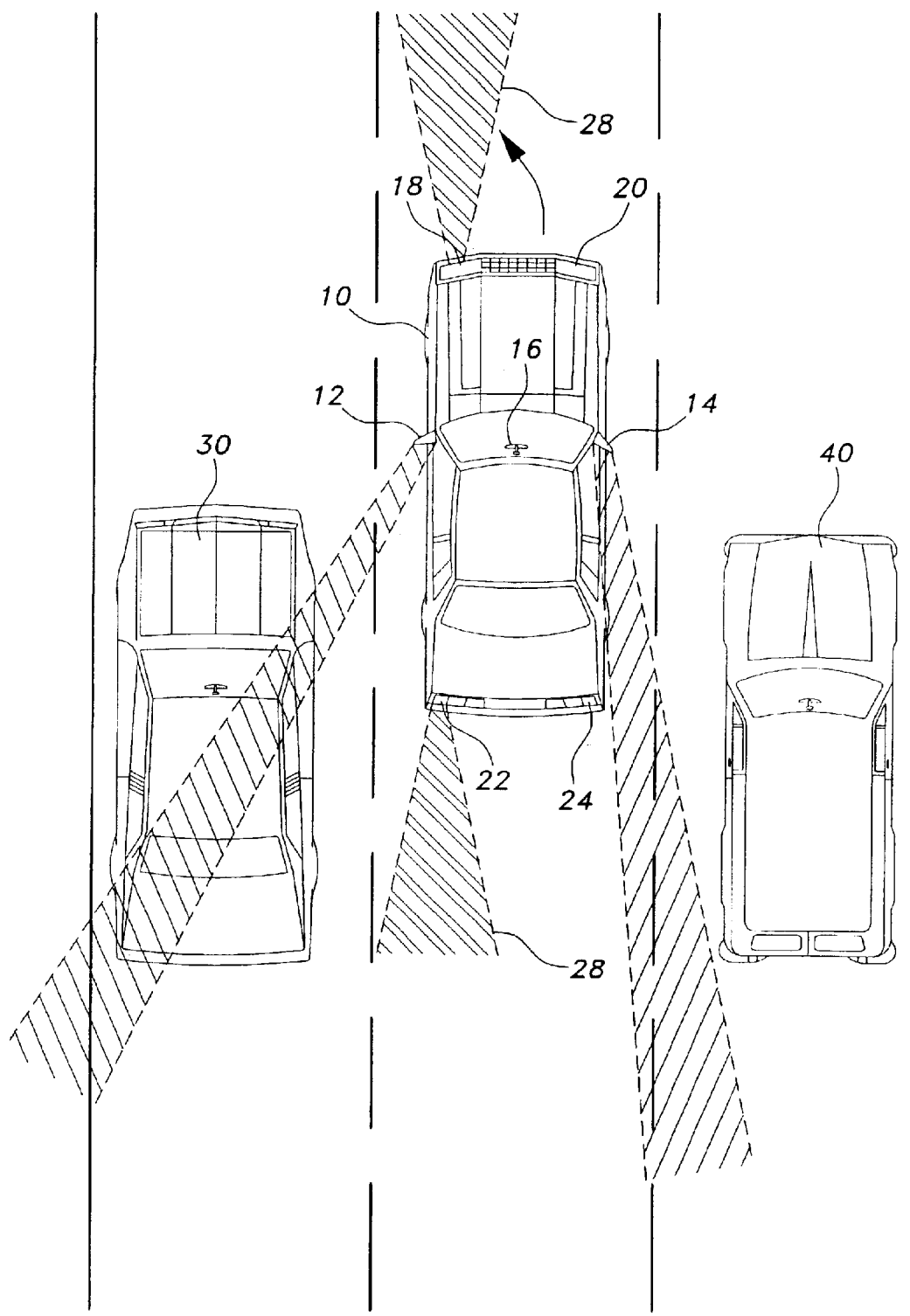
FIG. 2 is a top view of three vehicles driving along three driving lanes, where the middle vehicle is equipped with a vehicle blind spot monitoring system according to the present invention and has adjusted the left view mirror to within a blind spot orientation range.
Figure 3:
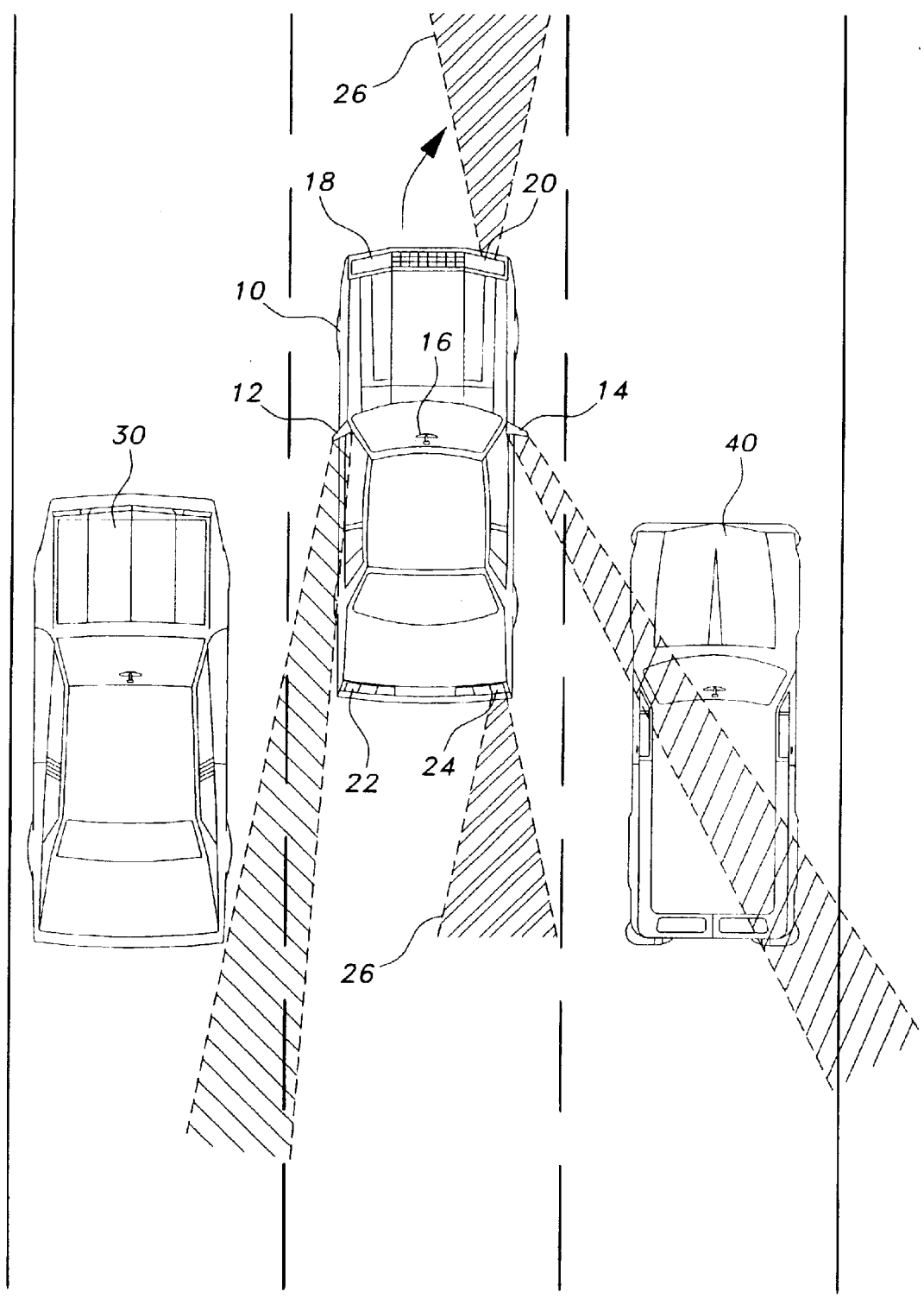
FIG. 3 is a top view of three vehicles driving along three driving lanes, where the middle vehicle is equipped with a vehicle blind spot monitoring system according to the present invention and has adjusted the right view mirror within a blind spot orientation range.

Referring to the drawings, FIGS. 1–3 show three vehicles 10,30,40 driving along three driving lanes. The middle vehicle 10 is equipped with a vehicle blind spot monitoring system according to the invention. The blind spot monitoring system enhances the ability of a vehicle occupant of the vehicle 10 to view objects that are in close proximity to the rear sides of the vehicle 10. Vehicles of any type may be equipped with a vehicle blind spot monitoring system according to the invention, such as cars, trucks, school buses, commercial buses, tractor trailers, construction equipment, farm equipment, motorcycles, recreational vehicles, motor/mobile homes, law enforcement vehicles, military vehicles, or the like.

Preferably, the vehicle blind spot monitoring system is provided for a vehicle at the time of vehicle manufacture. However, any manner of providing the vehicle blind spot monitoring system to a vehicle may be effected according to the desires of the user. As used herein, a normal orientation range refers to a range of orientations of side view mirrors about vertical and/or horizontal axes via associated motors where a driver of a vehicle is unable to view blind spots in close proximity to the side rear of the vehicle, and a blind spot orientation range refers to a range of orientations of side view mirrors about vertical and/or horizontal axes via associated motors where a driver of a vehicle is able to view blind spots in close proximity to the side rear of the vehicle using the associated side view mirror. FIG. 2 shows how the left view mirror 12 of vehicle 10 has been moved to a blind spot orientation range to enable the driver of vehicle 10 to observe vehicle 30 in the left driving lane. FIG. 3 shows how the right view mirror 14 of vehicle 10 has been moved to a blind spot orientation range to enable the driver of vehicle 10 to observe vehicle 40 in the right driving lane.

Figure 4:
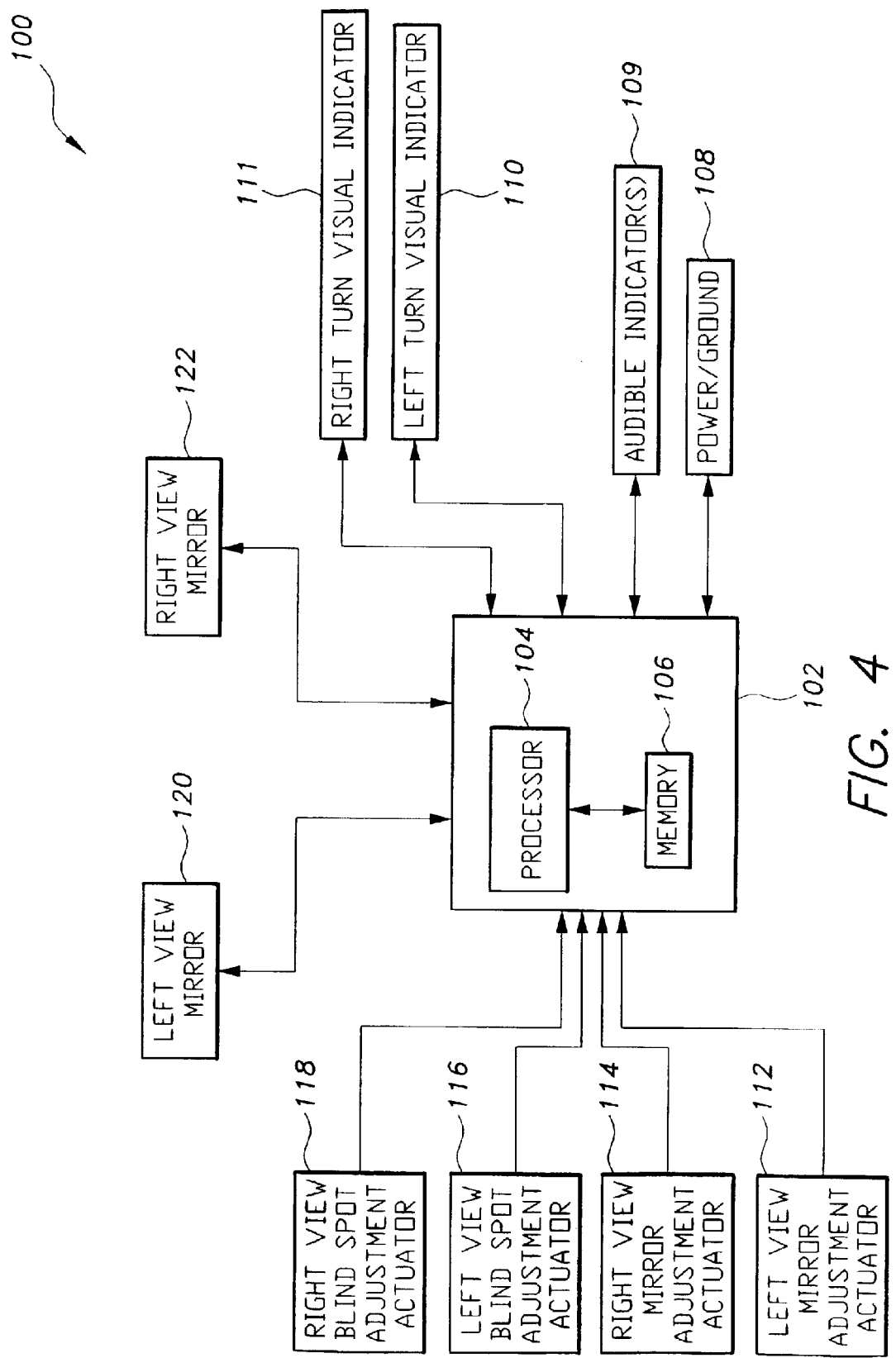
FIG. 4 is a block diagram of a vehicle blind spot monitoring system according to the present invention.

As shown in FIG. 4, a vehicle blind spot monitoring system 100 according to the invention includes a mirror controller 102 configured to control an angular orientation of one or more adjustable side view mirrors 120,122 about horizontal and/or vertical axes. The mirror controller 102 may be mounted anywhere in the vehicle, such as under the dash or the like. The mirror controller 102 includes a processor 104 and a memory 106. The processor 104 may be configured in the form of any known type of processor, and the memory 106 may be configured in the form of any known type of memory according to the desires of the user.

Major known electrical components are mounted within the mirror controller 102. Such components may include a printed circuit board mounted in firm support within a housing of the mirror controller 102. The circuit board may carry certain coupling and driver electronics with the processor 104 and the memory 106. The processor 104 may execute various programs under the control of the operating system of the mirror controller 102. The processor 104 may be connected to each component of the mirror controller 102 via a communication bus.

The memory 106 of the mirror controller 102 may include a writable memory used as an area for reading control logic executed in the processor 104, and/or a work area for writing data to be processed by executed control logic. The memory 106 may include any type of permanent/non-volatile, temporary/volatile random access memory, and/or any type of read only memory, to store control parameters and control logic to enable the processor 104 to effect control over the side view mirrors 120,122 of the vehicle. The memory 106 may be configured with any desired amount of memory. The memory 106 of the mirror controller 102 carries thereon control logic in the form of blindview software which, when executed by the processor 106 of the mirror controller 102, causes the processor 106 to carry out and cause a variety of functional steps to be executed.

The vehicle blind spot monitoring system 100 also includes a power/ground source 108, one or more audible indicators 109, one or more left turn visual indicators 110, one or more right turn visual indicators 111, one or more adjustable side view mirrors 120,122, one or more side view mirror adjustment actuators 112,114 configured to enable a user to remotely adjust, in a normal operating condition, an angular orientation of the adjustable side view mirrors 120,122 about horizontal and/or vertical axes, and one or more side view blind spot adjustment actuators 116,118 configured to enable a user to override the mirror adjustment actuators 112,114, remotely adjust, in a blind spot operating condition, an angular orientation of the adjustable side view mirrors 120,122 about vertical and/or horizontal axes, and enable the user to view objects that are in close proximity to the rear side areas of a vehicle.

The power/ground source 108 is preferably, but not limited to, a conventional vehicle battery or the like, and is mounted so as to be stationary with respect to the frame of the vehicle. The audible indicator(s) 109 may be any type of audible indicator included and/or installed in the vehicle, configured to indicate to the driver or other vehicle occupant an audible sound, such as a radio speaker or the like. The left and right turn visual indicators 110,111 may be any type of external and/or internal/dash visual indicators configured to alert others, as well as the driver or other vehicle occupants, as to a desired intent to turn the vehicle in a particular direction.

The mirror and blind spot adjustment actuators 112,114, 116,118 may be actuators of any type, such as buttons, switches, joysticks, switch pods, flat tabs, or the like. The mirror and blind spot adjustment actuators 112,114,116,118 and the adjustable side view mirrors 120,122 are each communicatively interconnected with the mirror controller 102. The mirror adjustment actuators 112,114 are preferably configured for being placed in the driver or left door of the vehicle. As is known in the art, a selector switch (not shown) may also be provided for enabling the driver or other vehicle occupant to select a particular side view mirror for adjustment. The blind spot adjustment actuators 116,118 are preferably configured for being placed within the steering wheel of a vehicle, such as left and right flat tabs or the like, placed within and under the surface material of the central portion of the steering wheel.

The blindview software causes the processor 104 to operate the vehicle blind spot monitoring system 100 when any of the mirror and/or blind spot adjustment actuators 112,114,116,118 are engaged by a vehicle occupant. The terms 'engaged', 'engaging', or 'engagement' as used herein in association with the mirror and blind spot adjustment actuators 112,114,116,118 refers to the conventional process of a vehicle driver or other vehicle occupant engaging, such as touching, contacting, holding, pressing, tapping, or the like, a conventional mirror actuator of a vehicle to effect the adjustment of a side view mirror of the vehicle. For example, when a vehicle driver or other occupant of the vehicle engages (e.g., touches, contacts, holds, presses, taps, etc.) a side view mirror adjustment actuator of a vehicle to effect adjustment of the associated side view mirror of the vehicle about vertical and/or horizontal axes via associated motors, the vehicle driver or other vehicle occupant maintains the force of their finger on or continues to engage the side view mirror adjustment actuator for a sufficient period of time, such as several seconds or the like, until the orientation of the associated side view mirror is adjusted to a desired position.

When any of the side view mirror adjustment actuators 112 or 114 are engaged by the vehicle driver or other vehicle occupant, the mirror controller 102 executes the blindview software and operates in a normal operating condition. When the mirror controller 102 is operating in a normal operating condition based on engagement of any side view mirror adjustment actuator 112 or 114 by the vehicle driver or other vehicle occupant, and one of the side view blind spot adjustment actuators 116 or 118 subsequently becomes engaged by the vehicle driver or other vehicle occupant, the normal operating condition of the mirror controller 102 is overriden and the mirror controller 102 operates in a blind spot operating condition. When the mirror controller 102 is operating in a blind spot operating condition based on engagement of any side view blind spot adjustment actuator 116 or 118 by the vehicle driver or other vehicle occupant, and the other side view blind spot actuator 116 or 118 subsequently becomes engaged by the vehicle driver or other vehicle occupant, the initially engaged side view blind spot adjustment actuator 116 or 118 maintains control of the mirror controller 102 in the blind spot operating condition until the initially engaged side view blind spot adjustment actuator 116 or 118 becomes disengaged by the vehicle driver or other vehicle occupant.

In other words, the engagement of either one of the side view blind spot adjustment actuators 116 or 118 causes the mirror controller 102 to override any functions effected by any engagement of the side view mirror adjustment actuators 112 or 114, and the initially engaged side view blind spot adjustment actuator 116 or 118 causes the mirror controller 102 to effect the function associated with the particular engaged side view blind spot adjustment actuator 116 or 118. If the other side view blind spot mirror adjustment actuator 116 or 118 is engaged during engagement of the opposing blind spot mirror adjustment actuator 116 or 118, functions associated with the other blind spot adjustment actuator 116 or 118 are not effected by the mirror controller 102 until engagement of the initially engaged blind spot adjustment actuator 116 or 118 ends.

When the left view mirror adjustment actuator 112 is engaged by a vehicle driver or other vehicle occupant for a sufficient period of time, such as several seconds or the like, adjustment of the left view mirror 120 is effected through a normal orientation range until the orientation of the left view mirror 120 is adjusted to a desired position. During this adjustment period, the mirror controller 102 executes the blindview software and operates in a normal operating condition. When the left view blind spot adjustment actuator 116 is engaged by a vehicle driver or other vehicle occupant for a momentary period of time, such as one second or the like, all activity of the mirror controller 102 based on any engagement of any side view mirror adjustment actuator 112 or 114 by the vehicle driver or other occupants of the vehicle is overridden, the mirror controller 102 executes the blindview software and operates in a blind spot operating condition, and all external and/or internal/dash left turn visual indicators 110 are activated to alert the vehicle driver and any individuals near the vehicle (e.g., other vehicle drivers, pedestrians, or the like) of the desire of the vehicle driver to turn the vehicle to the left.

The execution of the blindview software based on engagement of the left view blind spot adjustment actuator 116 by a vehicle driver or other vehicle occupant causes the left view mirror 120 to be adjusted to a preset blind spot orientation position that is stored in the memory 106 of the memory controller 102. If a preset blind spot orientation position is stored in the memory 106 of the memory controller 102 and the left view blind spot adjustment actuator 116 is engaged by a vehicle driver or other vehicle occupant for a momentary period of time, such as one second or the like, the left view mirror 120 is adjusted to the preset blind spot orientation position. Once the left view mirror 120 is adjusted to the preset blind spot orientation position stored in the memory 106 of the memory controller 102, the audible indicator(s) 109 are activated to emit a predetermined sound, such as one tone, beep, or the like, to alert the driver or other vehicle occupant that the left view mirror 120 has been adjusted to the preset blind spot orientation position of the left view mirror 120 stored in the memory 106 of the mirror controller 102.

If a preset blind spot orientation position is not stored in the memory 106 of the memory controller 102 and the left view blind spot adjustment actuator 116 is engaged by a vehicle driver or other vehicle occupant for a momentary period of time, such as one second or the like, the left view mirror 120 is not adjusted and the audible indicator(s) 109 are activated to emit a predetermined sound, such as two tones, beeps, or the like, to alert the driver or other vehicle occupant that the left view mirror 120 is not being adjusted and a preset blind spot orientation position of the left view mirror 120 is not stored in the memory 106 of the mirror controller 102.

The vehicle driver or other vehicle occupant may engage the left view blind spot actuator 116 for a sufficient period of time, such as several seconds or the like, to adjust the orientation of the left view mirror 120 to a desired blind spot orientation position. Once the left view mirror 120 is adjusted to the desired blind spot orientation position and the vehicle driver or other occupant disengages the blind spot actuator 116, the desired blind spot orientation position to which the left view mirror 120 has been adjusted is stored in the memory 106 of the memory controller 102 as the preset blind spot orientation position, and the audible indicator(s) 109 are activated to emit a predetermined sound, such as one tone, beep, or the like, to alert the driver or other vehicle occupant that the desired blind spot orientation position to which the left view mirror 120 has been adjusted is stored in the memory 106 of the memory controller 102 as the preset blind spot orientation position. While the adjusted blind spot orientation position is preferably within the blind spot orientation range to enable the driver or other vehicle occupant to view blind spots in close proximity to the left rear of the vehicle using the left view mirror 120, the adjusted blind spot orientation position may, nevertheless, be a position set within the normal orientation range.

When the left view blind spot actuator 116 has been engaged, the left view mirror has been adjusted to a blind spot orientation position (either a preset blind spot orientation position or a newly adjusted desired blind spot orientation position), and the left view blind spot actuator 116 has been disengaged, the memory controller 102 continues to operate in the blind spot operating condition. Any subsequent engagement of the left view blind spot actuator 116 by the vehicle driver or other vehicle occupant returns control of the mirror controller to the normal operating condition, all external and/or internal/dash left turn visual indicators 110 are deactivated, and the audible indicator(s) 109 are activated to emit a predetermined sound, such as two tones, beeps, or the like, to alert the driver or other vehicle occupant that the left view mirror 120 has been readjusted to the normal orientation position at which the left view mirror 120 was positioned prior to the activation of the blind spot operating condition based on the engagement of the left view blind spot actuator 116 by the vehicle driver or other vehicle occupant.

If the left view blind spot adjustment actuator 116 is engaged by the vehicle driver or other vehicle occupant and the right view blind spot adjustment actuator 118 becomes subsequently engaged, the left view blind spot adjustment actuator 116 maintains control of all mirror controller 102 activity until the left view blind spot adjustment actuator 116 becomes disengaged by the vehicle driver or other vehicle occupant. If engagement of the right hand blind spot adjustment actuator 118 by the vehicle driver or other vehicle occupant continues after the left hand blind spot adjustment actuator 116 is disengaged by the vehicle driver or other vehicle occupants, the right hand blind spot adjustment actuator 118 obtains and maintains all mirror controller 102 activity until the right view blind spot adjustment actuator 118 becomes disengaged by the vehicle driver or other vehicle occupants.

Data regarding the orientation of the left view mirror 120 may be monitored by monitoring elements, such as potentiometers or the like, and data regarding a particular orientation position of the left view mirror 120 may be saved when the left view mirror 120 is moved and initially reaches the blind spot orientation where the blind spot is viewable by the vehicle driver or other vehicle occupants. Saved data regarding a particular orientation position of the left view mirror 120 remains stored in the memory 106 of the mirror controller 102 until either one of the side view blind spot adjustment actuators 116 or 118 are engaged for a period of time sufficient to move the left view mirror 116 to a desired blind spot orientation position different from one saved. This enables a vehicle with a common driver to maintain a desired blind spot orientation position in the memory 106 of the mirror controller 102 until the driver or another vehicle operator decides to adjust the blind spot orientation position stored in the memory 106.

When the right view mirror adjustment actuator 114 is engaged by a vehicle driver or other vehicle occupant for a sufficient period of time, such as several seconds or the like, adjustment of the right view mirror 122 is effected through a normal orientation range until the orientation of the right view mirror 122 is adjusted to a desired position. During this adjustment period, the mirror controller 102 executes the blindview software and operates in a normal operating condition. When the right view blind spot adjustment actuator 118 is engaged by a vehicle driver or other vehicle occupant for a momentary period of time, such as one second or the like, all activity of the mirror controller 102 based on any engagement of any side view mirror adjustment actuator 112 or 114 by the vehicle driver or other occupants of the vehicle is overridden, the mirror controller 102 executes the blindview software and operates in a blind spot operating condition, and all external and/or internal/ dash right turn visual indicators 111 are activated to alert the vehicle driver and any individuals near the vehicle (e.g., other vehicle drivers, pedestrians, or the like) of the desire of the vehicle driver to turn the vehicle to the right.

The execution of the blindview software based on engagement of the right view blind spot adjustment actuator 118 by a vehicle driver or other vehicle occupant causes the right view mirror 122 to be adjusted to a preset blind spot orientation position that is stored in the memory 106 of the memory controller 102. If a preset blind spot orientation position is stored in the memory 106 of the memory controller 102 and the right view blind spot adjustment actuator 118 is engaged by a vehicle driver or other vehicle occupant for a momentary period of time, such as one second or the like, the right view mirror 122 is adjusted to the preset blind spot orientation position. Once the right view mirror 122 is adjusted to the preset blind spot orientation position stored in the memory 106 of the memory controller 102, the audible indicator(s) 109 are activated to emit a predetermined sound, such as one tone, beep, or the like, to alert the driver or other vehicle occupant that the right view mirror 122 has been adjusted to the preset blind spot orientation position of the right view mirror 122 stored in the memory 106 of the mirror controller 102.

If a preset blind spot orientation position is not stored in the memory 106 of the memory controller 102 and the right view blind spot adjustment actuator 116 is engaged by a vehicle driver or other vehicle occupant for a momentary period of time, such as one second or the like, the right view mirror 122 is not adjusted and the audible indicator(s) 109 are activated to emit a predetermined sounds such as two tones, beeps, or the like, to alert the driver or other vehicle occupant that the right view mirror 122 is not being adjusted and a preset blind spot orientation position of the right view mirror 122 is not stored in the memory 106 of the mirror controller 102.

The vehicle driver or other vehicle occupant may engage the right view blind spot actuator 118 for a sufficient period of time, such as several seconds or the like, to adjust the orientation of the right view mirror 122 to a desired blind spot orientation position. Once the right view mirror 122 is adjusted to the desired blind spot orientation position and the vehicle driver or other occupant disengages the right view blind spot adjustment actuator 118, the desired blind spot orientation position to which the right view mirror 120 has been adjusted is stored in the memory 106 of the memory controller 102 as the preset blind spot orientation position, and the audible indicator(s) 109 are activated to emit a predetermined sound, such as one tone, beep, or the like, to alert the driver or other vehicle occupant that the desired blind spot orientation position to which the right view mirror 122 has been adjusted is stored in the memory 106 of the memory controller 102 as the preset blind spot orientation position. While the adjusted blind spot orientation position is preferably within the blind spot orientation range to enable the driver or other vehicle occupant to view blind spots in close proximity to the right rear of the vehicle using the right view mirror 122, the adjusted blind spot orientation position may, nevertheless, be a position set within the normal orientation range.

When the right view blind spot actuator 118 has been engaged, the right view mirror 122 has been adjusted to a blind spot orientation position (either a preset blind spot orientation position or a newly adjusted desired blind spot orientation position), and the right view blind spot actuator 118 has been disengaged, the memory controller continues to operate in the blind spot operating condition. Any subsequent engagement of the right view blind spot actuator 118 by the vehicle driver or other vehicle occupant returns control of the mirror controller to the normal operating condition, all external and/or internal/dash right turn visual indicators 111 are deactivated, and the audible indicator(s) 109 are activated to emit a predetermined sound, such as two tones, beeps, or the like, to alert the driver or other vehicle occupant that the right view mirror 122 has been readjusted to the normal orientation position at which the right view mirror 122 was positioned prior to the activation of the blind spot operating condition based on the engagement of the right view blind spot actuator 118 by the vehicle driver or other vehicle occupant.

If the right view blind spot adjustment actuator 118 is engaged by the vehicle driver or other vehicle occupant and the left view blind spot adjustment actuator 116 becomes subsequently engaged, the right view blind spot adjustment actuator 118 maintains control of all mirror controller 102 activity until the right view blind spot adjustment actuator 118 becomes disengaged by the vehicle driver or other vehicle occupant. If engagement of the left hand blind spot adjustment actuator 116 by the vehicle driver or other vehicle occupant continues after the right hand blind spot adjustment actuator 118 is disengaged by the vehicle driver or other vehicle occupants, the left hand blind spot adjustment actuator 116 obtains and maintains all mirror controller 102 activity until the left view blind spot adjustment actuator 116 becomes disengaged by the vehicle driver or other vehicle occupants.

As with data regarding the orientation of the left view mirror 120 described above, data regarding the orientation of the right view mirror 122 may be monitored by monitoring elements, such as potentiometers or the like, and data regarding a particular orientation position of the right view mirror 122 may be saved when the right view mirror 122 is moved and initially reaches the blind spot orientation where the blind spot is viewable by the vehicle driver or other vehicle occupants. Saved data regarding a particular orientation position of the right view mirror 122 remains stored in the memory 106 of the mirror controller 102 until the right view blind spot adjustment actuators 118 are subsequently engaged for a period of time sufficient to move the right view mirror 122 to a desired blind spot orientation position different from one saved.

The vehicle blind spot monitoring system 100 installed on a vehicle enables the driver to safely check the blind spots on either of the vehicle without removing views from the steering wheel, altering the body, and/or turning the head from the normal driving position while making lane changes or passing other vehicles. The vehicle blind spot monitoring system 100 is handicapped and vehicle occupant friendly, and will reduce traffic accidents and deaths.

While the invention has been described with references to its preferred embodiment, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

I claim:

1. A vehicle blind spot monitoring system comprising:
   at least one adjustable side view mirror;
   a mirror controller with a processor and memory, said mirror controller being configured to control an angular orientation of said at least one adjustable side view mirror;
   at least one mirror adjustment actuator configured to enable a vehicle occupant to remotely adjust, in a normal operating condition, an angular orientation of said at least one adjustable side view mirror in a normal orientation range; and
   at least one blind spot adjustment actuator configured to enable a vehicle occupant to remotely adjust, in a blind spot operating condition, an angular orientation of said at least one adjustable side view mirror in a blind spot orientation range;
   wherein said at least one adjustable side view mirror, said at least one mirror adjustment actuator, and said at least one blind spot adjustment actuator are each communicatively interconnected with said mirror controller, and
   wherein said mirror controller memory carries thereon blindview software which, when executed by the processor, causes the processor to carry out steps comprising:
   saving data regarding a desired orientation position of said at least one side view mirror when said at least one side view mirror is adjusted and upon disengagement of at least one of said at least one mirror adjustment actuator and said at least one blind spot adjustment actuator by a user.

2. The vehicle blind spot monitoring system according to claim 1, wherein said at least one vehicle adjustable side view mirror comprises:
   an adjustable left view mirror; and
   an adjustable right view mirror.

3. The vehicle blind spot monitoring system according to claim 1, wherein said blindview software, when executed by the processor, further causes the processor to carry out steps comprising:
   adjusting one of said at least one side view mirror when an associated mirror adjustment actuator is engaged by a user for a period of time; and
   adjusting one of said at least one side view mirror when an associated blind spot adjustment actuator is engaged by a user for a period of time.

4. The vehicle blind spot monitoring system according to claim 3, wherein the step of adjusting one of said at least one side view mirror when an associated mirror adjustment actuator is engaged by a user for a period of time, when executed by the processor, further causes the processor to carry out steps comprising:
   adjusting an orientation position of a left view mirror when a left view mirror adjustment actuator is engaged by a user; and
   adjusting an orientation position of a right view mirror when a right view mirror adjustment actuator is engaged by a user.

5. The vehicle blind spot monitoring system according to claim 4, wherein the step of adjusting an orientation position of a left view mirror when a left view mirror adjustment actuator is engaged by a user, when executed by the processor, further causes the processor to carry out steps comprising:

adjusting the left view mirror to a normal orientation position within a normal orientation range when the left view mirror adjustment actuator is engaged for a period of time.

6. The vehicle blind spot monitoring system according to claim 5, wherein the step of adjusting the left view mirror to a normal orientation position within a normal orientation range when the left view mirror adjustment actuator is engaged for a period of time, when executed by the processor, further causes the processor to carry out steps comprising:

saving data regarding the normal orientation position of the left view mirror when the left view mirror is adjusted and upon disengagement of the left view mirror adjustment actuator by the user.

7. The vehicle blind spot monitoring system according to claim 5, wherein the step of adjusting the left view mirror to a normal orientation position within a normal orientation range when the left view mirror adjustment actuator is engaged for a period of time, when executed by the processor, further causes the processor to carry out steps comprising:

overriding movement activity of the left view mirror associated with the engaged left view mirror adjustment actuator when a left view blind spot adjustment actuator is engaged by a user for a period of time;

adjusting the left view mirror to a blind spot orientation position when the left view blind spot adjustment actuator is engaged by the user for a period of time;

activating an audible indicator to emit a blind spot engagement audible sound when the left view mirror is adjusted and initially reaches the blind spot orientation position;

activating all left turn visual indicators when the left view mirror is adjusted and initially reaches the blind spot orientation position;

activating the audible indicator to emit a blind spot disengagement audible sound when the left view blind spot adjustment actuator is disengaged and subsequently engaged by a user for a period of time, and the left view mirror is adjusted and returns to the normal orientation position; and deactivating all left turn visual indicators when the left view blind spot adjustment actuator is disengaged and is subsequently engaged by a user for a period of time.

8. The vehicle blind spot monitoring system according to claim 7, wherein the step of adjusting an orientation position of a left view mirror when a left hand mirror adjustment actuator is engaged by a user, when executed by the processor, further causes the processor to carry out steps comprising:

saving data regarding the blind spot orientation position of the left view mirror when the left view mirror is adjusted using the left view blind spot adjustment actuator and initially reaches the blind spot orientation position.

9. The vehicle blind spot monitoring system according to claim 4, wherein the step of adjusting an orientation position of a right view mirror when a right mirror adjustment actuator is engaged by a user, when executed by the processor, further causes the processor to carry out steps comprising:

adjusting the right view mirror to a normal orientation position within a normal orientation range when the right view mirror adjustment actuator is engaged for a period of time.

10. The vehicle blind spot monitoring system according to claim 9, wherein the step of adjusting the right view mirror to a normal orientation position within a normal orientation range when the right view mirror adjustment actuator is engaged for a period of time, when executed by the processor, further causes the processor to carry out steps comprising:

saving data regarding the normal orientation position of the right view mirror when the right view mirror is adjusted and upon disengagement of the right view mirror adjustment actuator by the user.

11. The vehicle blind spot monitoring system according to claim 9, wherein the step of adjusting the right view mirror to a normal orientation position within a normal orientation range when the right view mirror adjustment actuator is engaged for a period of time, when executed by the processor, further causes the processor to carry out steps comprising:

overriding movement activity of the right view mirror associated with the engaged right view mirror adjustment actuator when a right view blind spot adjustment actuator is engaged by a user for a period of time;

adjusting the right view mirror to a blind spot orientation position when the right vie blind spot adjustment actuator is engaged by the user for a period of time;

activating an audible indicator to emit a blind spot engagement audible sound when the right view mirror is adjusted and initially reaches the blind spot orientation position;

activating all right to turn visual indicators when the right view mirror is adjusted and initially reaches the blind spot orientation position;

activating the audible indicator to emit a blind spot disengagement audible sound when the right view blind spot adjustment actuator is disengaged and subsequently engaged by a use for a period of time, and the right view mirror is adjusted and returns to the normal orientation position; and deactivating all right turn visual indicators when the right view blind spot adjustment actuator is disengaged and is subsequently engaged by a user for a period of time.

12. The vehicle blind spot monitoring system according to claim 11, wherein the step of adjusting the right view mirror to a normal orientation position within a normal orientation range when the right view mirror adjustment actuator is engaged for a period of time, further causes the processor to carry out steps comprising:

saving data regarding the blind spot orientation position of the right view mirror when the right view mirror is adjusted using the right view blind spot adjustment actuator and initially reaches the blind spot orientation position.

13. The vehicle blind spot monitoring system according to claim 3, wherein the step of adjusting one of said at least one side view mirror when an associated adjustment actuator is engaged by a user for a period of time, when executed by the processor, further causes the processor to carry out steps comprising:

adjusting an orientation position of a left view mirror when a left view blind spot adjustment actuator is engaged by a user; and adjusting an orientation position of a right view mirror when a right view blind spot adjustment actuator is engaged by a user.

14. The vehicle blind spot monitoring system according to claim 13, wherein the step of adjusting an orientation position of a left view mirror when a left view blind spot adjustment actuator is engaged by a user, when executed by the processor, further causes the processor to carry out steps comprising:

adjusting the left view mirror from a normal orientation position to a blind spot orientation position when the left view blind spot adjustment actuator is engaged by the user for a period of time.

15. The vehicle blind spot monitoring system according to claim 14, wherein the step of adjusting the left view mirror from a normal orientation position to a blind spot orientation position when the left view blind spot adjustment actuator is engaged by the user for a period of time, when executed by the processor, further causes the processor to carry out steps comprising:

saving data regarding the blind spot orientation position of the left view mirror when the left view minor is adjusted and upon disengagement of the left view mirror adjustment actuator by the user.

16. The vehicle blind spot monitoring system according to claim 14, wherein the step of adjusting the left view mirror from a normal orientation position to a blind spot orientation position when the left view blind spot adjustment actuator is engaged by the user for a period of time, when executed by the processor, further causes the processor to carry out steps comprising:

activating an audible indicator to emit a blind spot engagement audible sound when the left view mirror is adjusted and initially reaches the blind spot orientation position;

activating all left turn visual indicators when the left view mirror is adjusted and initially reaches the blind spot orientation position;

activating the audible indicator to emit a blind spot disengagement audible sound when the left view blind spot adjustment actuator is disengaged and subsequently engaged by a user for a period of time, and the left view mirror is adjusted and returns to the normal orientation position; and deactivating all left turn visual indicators when the left view blind spot adjustment actuator is disengaged and is subsequently engaged by a user for a period of time.

17. The vehicle blind spot monitoring system according to claim 13, wherein the step of adjusting an orientation position of a right view mirror when a right view blind spot adjustment actuator is engaged by a user, when executed by the processor, further causes the processor to carry out steps comprising:

adjusting the right view mirror from a normal orientation position to a blind spot orientation position when the right view blind spot adjustment actuator is engaged by the user for a period of time.

18. The vehicle blind spot monitoring system according to claim 17, wherein the step of adjusting the right view mirror from a normal orientation position to a blind spot orientation position when the right view blind spot adjustment actuator is engaged by the user for a period of time, when executed by the processor, further causes the processor to carry out steps comprising:

saving data regarding the blind spot orientation position of the right view mirror when the right view mirror is adjusted and upon disengagement of the right view mirror adjustment actuator by the user.

19. The vehicle blind spot monitoring system according to claim 17, wherein the step of adjusting the right view mirror from a normal orientation position to a blind spot orientation position when the right view blind spot adjustment actuator is engaged by the user for a period of time, when executed by the processor, further causes the processor to carry out steps comprising:

activating an audible indicator to emit a blind spot engagement audible sound when the right view mirror is adjusted and initially reaches the blind spot orientation position;

activating all right turn visual indicators when the right view mirror is adjusted and initially reaches the blind spot orientation position;

activating the audible indicator when the right view blind spot adjustment actuator to emit a blind spot disengagement audible sound when the right view blind spot adjustment actuator is disengaged and subsequently engaged by a user for a period of time, and the right view mirror is adjusted and returns to the normal orientation position; and deactivating all right turn visual indicators when the right view blind spot adjustment actuator is disengaged and is subsequently engaged by a user for a period of time.

20. The vehicle blind spot monitoring system according to 19, wherein the step of adjusting the right view mirror from a normal orientation position to a blind spot orientation position when the right view blind spot adjustment actuator is engaged by the user for a period of time, further causes the processor to carry out steps comprising:

saving data regarding the blind spot orientation position of the right view mirror when the right view mirror is adjusted and initially reaches the blind spot orientation position.

* * * * *